(12) United States Patent
Lee

(10) Patent No.: US 11,408,629 B2
(45) Date of Patent: Aug. 9, 2022

(54) ARTIFICIAL INTELLIGENCE DEVICE

(71) Applicant: LG ELECTRONICS INC., Seoul (KR)

(72) Inventor: Dongkyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 345 days.

(21) Appl. No.: 16/492,876

(22) PCT Filed: Apr. 23, 2019

(86) PCT No.: PCT/KR2019/004915
§ 371 (c)(1),
(2) Date: Sep. 10, 2019

(87) PCT Pub. No.: WO2020/218632
PCT Pub. Date: Oct. 29, 2020

(65) Prior Publication Data
US 2021/0190360 A1    Jun. 24, 2021

(51) Int. Cl.
| | | |
|---|---|---|
| *F24F 11/62* | (2018.01) | |
| *F24F 8/00* | (2021.01) | |
| *F24F 7/003* | (2021.01) | |
| *F24F 11/00* | (2018.01) | |
| *G05B 13/02* | (2006.01) | |
| *G05B 13/04* | (2006.01) | |
| *G06N 3/04* | (2006.01) | |

(52) U.S. Cl.
CPC ............ *F24F 11/62* (2018.01); *F24F 7/003* (2021.01); *F24F 8/00* (2021.01); *F24F 11/0001* (2013.01); *G05B 13/027* (2013.01); *G05B 13/048* (2013.01); *G06N 3/0445* (2013.01)

(58) Field of Classification Search
CPC ........ F24F 11/006; F24F 11/0012; F24F 8/00; F24F 11/0001; F24F 11/62; G05B 13/027; G05B 13/048
See application file for complete search history.

(56) References Cited

U.S. PATENT DOCUMENTS 4,352,321 A * 10/1982 Fukui ................. B60H 1/008
165/249
6,125,105 A * 9/2000 Edwards ............. H04L 12/5602
370/230
(Continued)

FOREIGN PATENT DOCUMENTS

JP          6252673 B2    12/2017
KR    10-2009-0115443 A    11/2009
(Continued)

*Primary Examiner* — Vincent H Tran
(74) *Attorney, Agent, or Firm* — Birch, Stewart, Kolasch & Birch, LLP

(57) ABSTRACT

Disclosed herein is an artificial intelligence device. An an artificial intelligence device according to an embodiment of the present invention includes a communication unit that obtains an external environmental factor and an internal environmental factor collected by a sensor and a processor that provides the internal environmental factors to an environmental factor prediction model to predict a subsequent internal environmental factor and allows a ventilation system and an air cleaning system to operate cooperatively with each other based on the predicted internal environmental factor.

13 Claims, 11 Drawing Sheets

(56) References Cited

U.S. PATENT DOCUMENTS

| | | | | |
|---|---|---|---|---|
| 2012/0253523 A1* | 10/2012 | Harrod | ............... | G05B 19/042 |
| | | | | 700/276 |
| 2013/0282185 A1* | 10/2013 | Nishimura | ......... | G05D 23/1919 |
| | | | | 700/276 |
| 2014/0365017 A1* | 12/2014 | Hanna | ................ | F24F 11/30 |
| | | | | 700/276 |
| 2017/0130981 A1* | 5/2017 | Willette | ................ | F24F 3/16 |
| 2017/0154517 A1* | 6/2017 | Aliakseyeu | ............ | H04W 4/02 |
| 2017/0328591 A1* | 11/2017 | Kelly | .................. | F24F 11/30 |
| 2017/0350611 A1* | 12/2017 | Su | ............... | F24F 3/16 |
| 2018/0088544 A1* | 3/2018 | Sawada | ................ | F24F 11/89 |
| 2018/0195752 A1* | 7/2018 | Sasaki | ................ | F24F 11/80 |
| 2019/0178514 A1* | 6/2019 | Sasaki | ............... | G05B 13/048 |
| 2019/0325328 A1* | 10/2019 | Katz | .................. | G06F 17/14 |
| 2020/0003437 A1* | 1/2020 | Breen | ................ | A61B 5/0002 |
| 2020/0224915 A1* | 7/2020 | Nourbakhsh | ...... | G01N 33/0034 |
| 2021/0055015 A1* | 2/2021 | Liu | ................ | F24F 11/30 |
| 2021/0140670 A1* | 5/2021 | Matsuura | ........... | A47L 11/4011 |
| 2021/0164682 A1* | 6/2021 | Mujumdar | ........... | G05B 19/042 |
| 2021/0180810 A1* | 6/2021 | Wright | ................ | G05B 15/02 |

FOREIGN PATENT DOCUMENTS

| | | |
|---|---|---|
| KR | 10-1278245 B1 | 6/2013 |
| KR | 10-1757446 B1 | 7/2017 |
| KR | 10-2019-0026519 A | 3/2019 |

\* cited by examiner

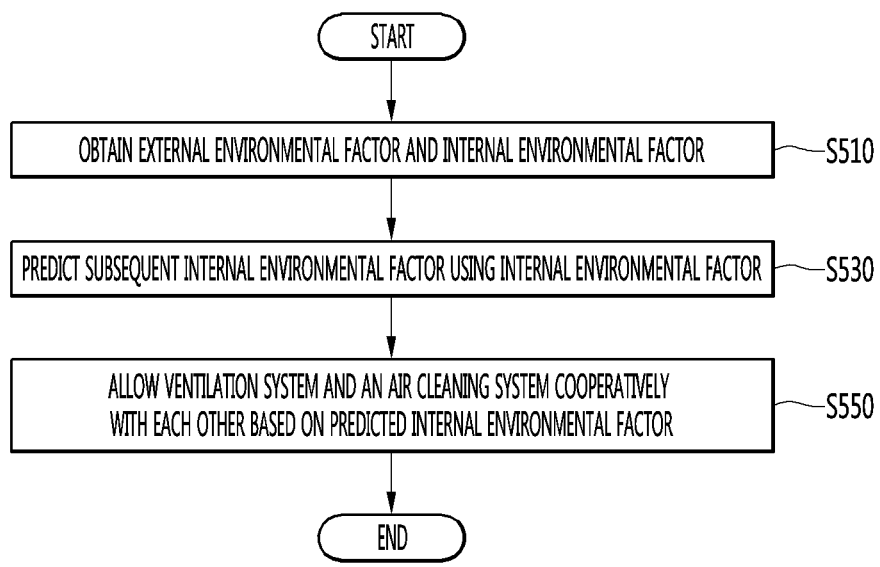

овlig # ARTIFICIAL INTELLIGENCE DEVICE

CROSS REFERENCE TO RELATED APPLICATIONS

This application is the National Phase of PCT International Application No. PCT/KR2019/004915, filed on Apr. 23, 2019, which is hereby expressly incorporated by reference into the present application.

BACKGROUND OF THE INVENTION

1. Field of the Invention

The present invention relates to an artificial intelligence device capable of predicting a dust concentration and allowing a ventilation system and an air cleaning system to operate cooperatively with each other according to a prediction result.

2. Discussion of the Related Art

Artificial intelligence is a field of computer engineering and information technology that research a method for allowing computers to do thinking, learning, self-development or the like that can be done by human intelligence, and means that computers is allowed to imitate human intelligent behavior.

In addition, the artificial intelligence does not exist by itself, but is directly or indirectly related to other fields of computer science. Especially, artificial intelligent factors has been introduced in the various field of information technology, and it has been actively attempted to utilize them to solve problems in the field.

On the other hand, techniques for perceiving and learning surrounding environment using artificial intelligence, providing information desired by a user in a desired form, or performing an operation or function desired by the user are being actively studied.

Recently, interest in fine dust is increasing, and accordingly, sales of air cleaners and air cleaning systems are increasing rapidly. Also, in recent years, the interest in the energy recovery ventilation (ERV) system that circulates outside air to the inside for a comfortable indoor environment is also increasing.

On the other hand, continuous operation of the air cleaner or the ventilation system increases energy consumption, and there is a growing need to operate the air purifier system and the ventilation system cooperatively with each other in accordance with various situations.

SUMMARY OF THE INVENTION

The present invention relates to an artificial intelligence device capable of predicting a dust concentration and allowing a ventilation system and an air cleaning system to operate cooperatively with each other according to a prediction result.

According to an embodiment of the present invention, an artificial intelligence device may include a communication unit that obtains an external environmental factor and an internal environmental factor collected by a sensor and a processor that provides the internal environmental factor to an environmental factor prediction model to predict a subsequent internal environmental factor and allows a ventilation system and an air cleaning system operate cooperatively with each other based on the predicted internal environmental factor.

According to the present invention, by comparing the indoor dust concentration with the outdoor dust concentration and selectively operating the ventilation system and the air cleaner according to a comparison result, it is possible to perform optimal air conditioning and reduce the power consumption.

BRIEF DESCRIPTION OF THE DRAWINGS

FIG. 5 is a diagram for explaining a method of operating an artificial intelligence device according to an embodiment of the present invention.

FIGS. 6 and 7 are diagrams for describing a method of generating an environmental factor prediction model according to an embodiment of the present invention.

DETAILED DESCRIPTION OF THE PREFERRED EMBODIMENTS

Figure 1:
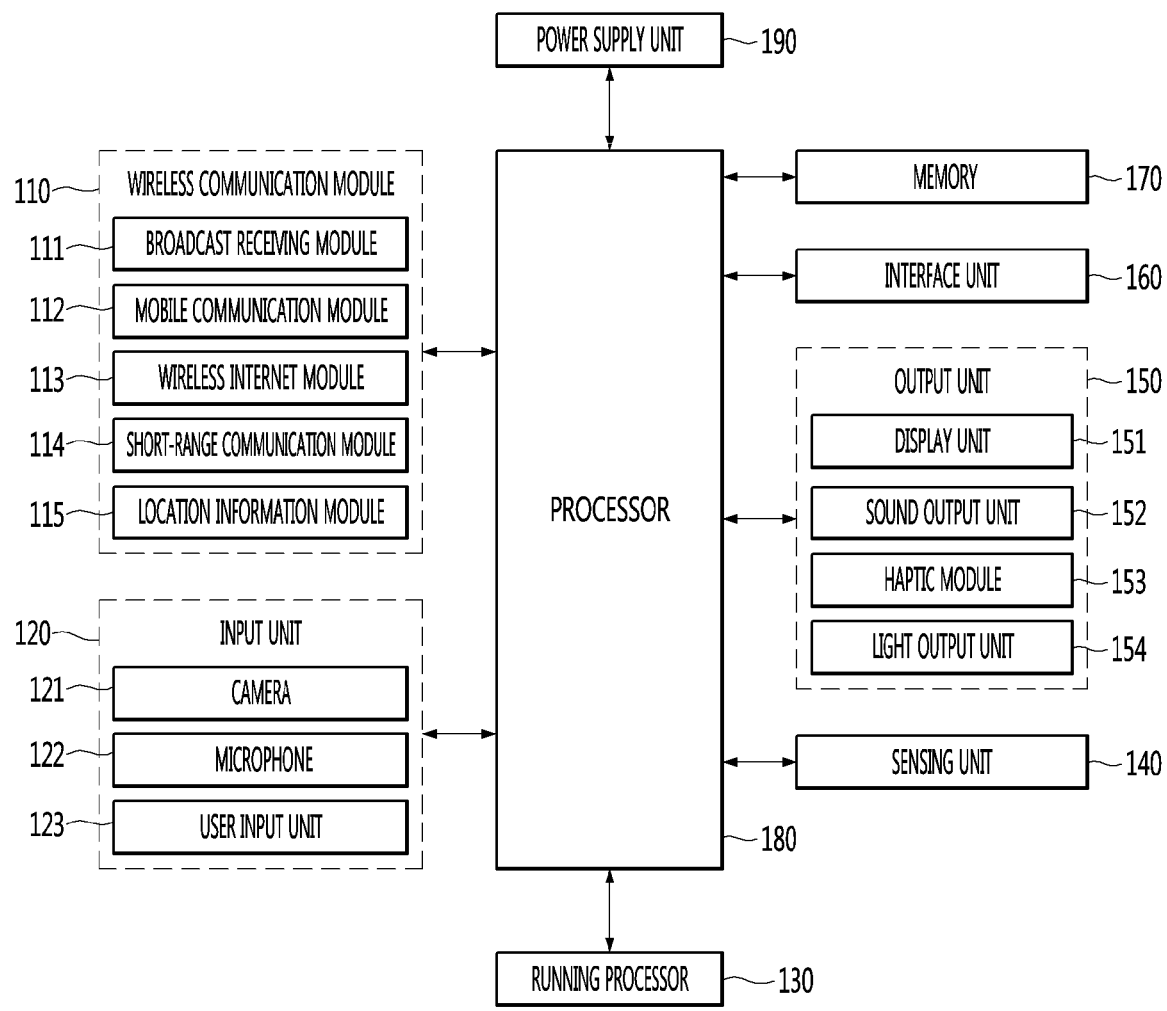
FIG. 1 is a block diagram showing a configuration of a terminal according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

As used herein, singular forms may include plural forms as well unless the context clearly indicates otherwise. It will be further understood that the terms "comprises," "comprising," "having," "having," "includes," "including" and/or variations thereof, when used in this specification, specify the presence of stated features, integers, steps, operations, elements, and/or components, but do not preclude the presence or addition of one or more other features, integers, steps, operations, elements, components, and/or groups thereof.

Although the present invention is implemented to have components for convenience of description, these components may be embodied in a single device or module, or one component may be embodied in multiple devices or modules.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be trained by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN trained based on training data may classify or cluster input data, based on a pattern of the input data.

In this specification, an ANN trained based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be trained in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be trained by receiving and using data which does not deceive the discriminator, and the discriminator may be trained by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

The artificial neural network has its structure specified by model composition, an activation function, a loss function, a cost function, a learning algorithm, an optimization algorithm, or the like, and has its contents specified in such a way that a hyperparameter is previously set before learning, a model parameter is set through learning.

For example, factors for determining the structure of the artificial neural network may include the number of hidden layers, the number of hidden nodes included in each hidden layer, an input feature vector, a target feature vector, and the like.

The hyperparameter includes several parameters that needs to be set initially for learning, such as an initial value of a model parameter. In addition, the model parameter includes various parameters to be determined through learning.

For example, the hyperparameter may include an initial weight between nodes, an initial bias between nodes, a mini-batch size, the number of learning repetitions, a learning rate, and the like. The model parameter may include inter-node weights, inter-node deflections, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use Mean Squared Error (MSE) or Cross Entropy Error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

In this case, the step size may mean a learning rate.

A gradient descent method may obtain a slope by differentiating the loss function to model parameters, and perform updating by changing the model parameters in the direction of the obtained slope at the learning rate.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram showing a configuration of a terminal 100 according to an embodiment of the present invention.

The terminal 100 may be implemented with a mobile phone, a projector, a mobile phone, a smart phone, a laptop computer, a digital broadcasting terminal, a personal digital assistant (PDA), a portable multimedia player (PMP), a navigation device, a slate PC, a tablet PC, an ultrabook, a wearable device (e.g., a smartwatch, a smart glass, or a head mounted display (HMD)), a set top box (STB), a DMB receiver, a radio, a washing machine, a refrigerator, an air conditioner, a desktop computer, a fixed device such as a digital signage, or a movable device.

That is, the terminal 100 may be implemented in the form of various home appliances used in the home, and may also be applied to a fixed or movable robot.

The terminal 100 may perform a function of a speech agent. The speech agent may be a program that recognizes a user's speech and outputs a response suitable for the recognized user's speech with speech.

The terminal 100 may be implemented with a mobile phone, a projector, a mobile phone, a smart phone, a laptop computer, a digital broadcasting terminal, a personal digital assistant (PDA), a portable multimedia player (PMP), a navigation device, a slate PC, a tablet PC, an ultrabook, a wearable device (e.g., a smartwatch, a smart glass, or a head mounted display (HMD)), a set top box (STB), a DMB receiver, a radio, a washing machine, a refrigerator, an air conditioner, a desktop computer, a fixed device such as a digital signage, or a movable device.

That is, the terminal 100 may be implemented in the form of various home appliances used in the home, and may also be applied to a fixed or movable robot.

The terminal 100 may perform a function of a speech agent. The speech agent may be a program that recognizes a user's speech and outputs a response suitable for the recognized user's speech with speech.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

A trained model may be mounted on the terminal 100.

On the other hand, the trained model may be implemented in hardware, software, or a combination of hardware and software, and, when a part or whole of the trained model is implemented in software, one or more instructions constituting the trained model may be stored in memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may obtain a training data for model learning and input data to be used when an output is obtained by using a trained model.

The input unit 120 may obtain raw input data. In this case, the processor 180 or the running processor 130 may pre-process the obtained data to generate training data or pre-processed input data which may be input to a learning model.

In this case, the preprocessing for the input data may mean extracting an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The running processor 130 learns a model composed of artificial neural networks using the training data.

In detail, the running processor 130 may determine optimized model parameters of the artificial neural network by repeatedly learning the artificial neural network using the various learning techniques described above.

In this specification, an artificial neural network whose parameters are determined by being trained using training data may be referred to as a learning model or a trained model.

In this case, the trained model may be used to infer result values for new input data rather than the training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Herein, database may be implemented using a memory 170, a memory 230 of a learning device 200, a memory maintained in a cloud computing environment, or other remote memory location accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technique, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model trained by the running processor 130 or the learning device 200.

In this case, the memory 170 may store the trained model into a plurality of versions according to a learning time or learning progress according to necessity.

In this case, the memory 170 may store input data obtained by the input unit 120, learning data (or training data) used for model learning, a learning history of the model, and the like.

In this case, the input data stored in the memory 170 may be not only processed data suitable for model learning, but also raw input data itself.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
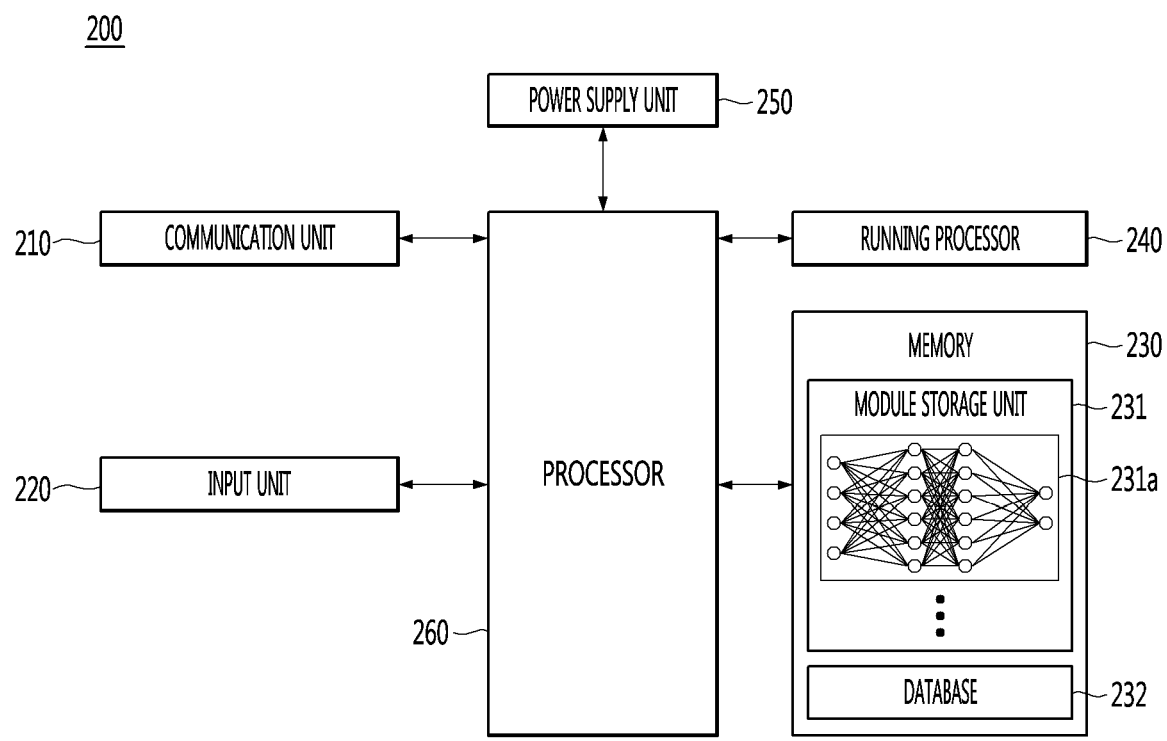
FIG. 2 is a block diagram illustrating a configuration of a learning device for an artificial neural network according to an embodiment of the present invention.

FIG. 2 is a block diagram illustrating a configuration of a learning device 200 for an artificial neural network according to an embodiment of the present invention.

The learning device 200 is a device or a server separately configured outside the terminal 100 and may perform the same function as the running processor 130 of the terminal 100.

That is, the learning device 200 may be configured to receive, classify, store, and output information to be used for data mining, data analysis, intelligent decision making, and machine learning algorithms. Here, the machine learning algorithm may include a deep learning algorithm.

The learning device 200 may communicate with at least one terminal 100, and may derive a result by analyzing or learning data for assistance to or on behalf of the terminal 100. Here, the assistance to another apparatus may mean distribution of computation through distributed processing.

The learning device 200 of the artificial neural network is various devices for learning the artificial neural network, and may generally mean a server, and may be referred to as a learning device or a learning server.

In particular, the learning device 200 may be implemented not only with a single server but also with a plurality of server sets, a cloud server, or a combination thereof.

That is, the learning device 200 may be configured in plural to constitute a learning device set (or a cloud server), and the at least one learning device 200 included in the learning device set may derive results by performing data analysis or learning through distributed processing.

The learning device 200 may transmit the model trained by machine learning or deep learning to the terminal 100 periodically or at a request.

Referring to FIG. 2, the learning device 200 may include a communication unit 210, an input unit 220, a memory 230, a learning processor 240, a power supply unit, 250, a processor 260, and the like.

The communication unit 210 may correspond to a configuration including the wireless communication unit 110 and the interface unit 160 of FIG. 1. That is, data may be transmitted and received with other devices through wired/wireless communication or an interface.

The input unit 220 has a configuration corresponding to the input unit 120 of FIG. 1, and may obtain data by receiving data through the communication unit 210.

The input unit 220 may obtain input data for obtaining an output or the like, using training data for model training and a trained model.

The input unit 120 may obtain raw input data. In this case, the processor 180 may preprocess the obtained data to generate training data or preprocessed input data which may be input to a learning model.

In this case, the preprocessing of the input data performed by the input unit 220 may mean extracting an input feature from the input data.

The memory 230 has a configuration corresponding to the memory 170 of FIG. 1.

The memory 230 may include a model storage unit 231, a database 232, and the like.

The model storage unit 231 stores the model being learned or learned through the running processor 240 (or artificial neural network 231*a*), and stores an updated model when the model is updated through training.

In this case, the model storage unit 231 may classify the learned models into a plurality of versions according to a learning time point or a learning progress level as needed.

The artificial neural network 231*a* shown in FIG. 2 is only one example of an artificial neural network including a plurality of hidden layers, and the artificial neural network of the present invention is not limited thereto.

The artificial neural network 231*a* may be implemented in hardware, software, or a combination of hardware and software. When a part or entire of the artificial neural network 231*a* is implemented in software, one or more instructions constituting the artificial neural network 231*a* may be stored in the memory 230.

The database 232 may store input data obtained by the input unit 120, learning data (or training data) used for model learning, a learning history of the model, and the like.

The input data stored in the database 232 may be not only processed data suitable for model learning, but also raw input data itself.

The running processor 240 has a configuration corresponding to the running processor 130 of FIG. 1.

The running processor 240 may train or learn the artificial neural network 231*a* using training data or a training set.

The running processor 240 obtains data obtained by preprocessing the input data obtained by the processor 260 through the input unit 220 to learn the artificial neural network 231*a* or obtains the preprocessed input data stored in the database 232 to learn the artificial neural network 231*a*.

Specifically, the running processor 240 may determine optimized model parameters of the artificial neural network 231*a* by repeatedly learning the artificial neural network 231*a* using the various learning techniques described above.

In this specification, an artificial neural network whose parameters are determined by being trained using training data may be referred to as a learning model or a trained model.

In this case, the trained model may infer a result value in the state of being mounted in the learning device 200 of an artificial neural network, or may be transmitted and mounted to another device such as the terminal 100 through the communication unit 210.

In addition, when the trained model is updated, the updated trained model may be transmitted to and mounted on another device such as the terminal 100 through the communication unit 210.

The power supply unit 250 has a configuration corresponding to the power supply unit 190 of FIG. 1.

Duplicate descriptions of configurations corresponding to each other will be omitted.

The term 'terminal' 100 may be used interchangeably with the term 'artificial intelligence device' 100.

Next, the air cleaner 700 will be described. The term 'air cleaner' 700 may be used interchangeably with the term 'air cleaner system' 700.

Figure 3:
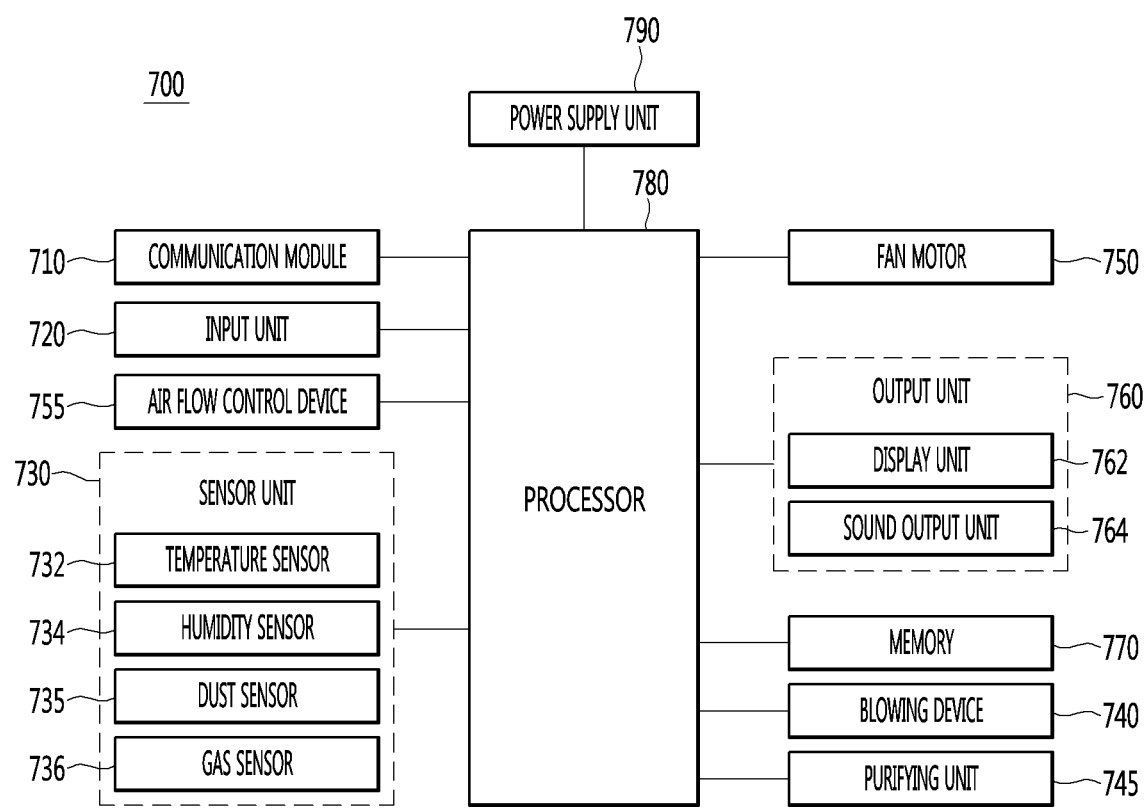
FIG. 3 is a schematic block diagram of components included in an air cleaner according to an embodiment of the present invention.

FIG. 3 is a schematic block diagram of components included in an air cleaner according to an embodiment of the present invention.

Referring to FIG. 3, an air cleaner 700 may include a communication unit 710, an input unit 720, a sensor unit 730, a blowing device 740, a fan motor 750, an output unit 760, a memory 770, a processor 780, and a power supply unit 790. The components shown in FIG. 1B are not essential for implementing an air cleaner and therefore, the air cleaner described herein may have more or less components than those listed above.

More specifically, the communication unit 710 of the above-mentioned components may include one or more modules for enabling wired communication or wireless communication between the air cleaner 700 and an external device (e.g., a mobile air cleaner such as a moving agent, a smartphone, or a tablet PC, or a fixed air cleaner such as a desktop computer) or between the air cleaner 700 and an external server.

The communication unit 710 may also include one or more modules that connect the air cleaner 700 to one or more networks.

When the communication unit 710 supports wireless communication, the communication unit 710 may include at least one of a wireless Internet module and a short-range communication module.

The wireless Internet module refers to a module for wireless Internet access and may be provided inside or outside the air cleaner 700.

The wireless Internet module is configured to transmit and receive wireless signals in a communication network according to wireless Internet technologies. The wireless Internet technologies may include, for example, WLAN (Wireless LAN), Wi-Fi (Wireless-Fidelity), Wi-Fi (Wireless Fidelity) Direct, and DLNA (Digital Living Network Alliance).

The short-range communication module is for short-range communication and may support short-range communication by using at least one of technologies such as Bluetooth™, Infrared Data Association (IrDA), ZigBee, and NFC (Near Field Communication. The short-range communication module may support wireless communication between the air cleaner 700 and the external device through wireless area networks. The wireless area networks may be wireless personal area networks.

The input unit 720 may include a touch key, a mechanical key, a dial key, and the like for receiving information or commands from a user. According to an embodiment, the input unit 720 may be understood as a concept including an interface unit that receives information or commands from a separate remote control device.

Specifically, the input unit 720 is for receiving information from the user, and the processor 780 may control operation of the air cleaner 700 so as to correspond to input information when the information is inputted through the input unit 720.

The input unit 720 may include mechanical input means (or a mechanical key such as a button located on the front, rear or side of the air cleaner 700, a dome switch, a jog wheel, a jog switch, or the like) and touch input means.

As an example, the touch input means may include a virtual key, a soft key, or a visual key displayed on the touch screen through software processing, or a touch key disposed in the other portion than the touch screen. Meanwhile, the virtual key or visual key may be displayed on the touch screen while having various forms, and may be made of, for example, a graphic, text, icon, video, or a combination thereof.

The sensor unit 730 may include one or more sensors for sensing at least one of surrounding environment information of the air cleaner 700 and user information.

For example, the sensor unit 730 may include a temperature sensor 732 for sensing a temperature of a space in which the air cleaner 700 is installed, and a humidity sensor 734 for sensing a humidity of the space.

The sensor unit 730 may include a dust sensor 735 for sensing the amount of dust in the air and a gas sensor 736 for sensing the amount of gas in the air.

The output unit 760 is for generating an output related to sight, hearing, or the like, and may include at least one of a display unit 762, and a sound output unit 764 (for example, a speaker)

The display unit 762 may implement a touch screen in such a manner that the display unit 151 forms a layer structure with or is integrally formed with a touch sensor. Such a touch screen may function as a user input unit 720 that provides an input interface between the learning system 700 and the user and may provide an output interface between the learning system 700 and the user.

The display unit 762 may display various types of information related to the operation of the air cleaner 700. For example, the display unit 762 may display information such as an air flow rate, a wind direction, a current room temperature, a humidity, or an air quality, and information on an operation mode such as a power saving mode, a general mode, or a sleep mode.

The sound output unit 764 may output a signal in the form of speech to notify the occurrence of an event of the air cleaner 700. Examples of events occurring in the air cleaner 700 may include an alarm, power on/off, error occurrence, operation mode change, and the like.

The memory 770 may store data that supports various functions of the air cleaner 700. The memory 770 may store various data and instructions for the operation of the air cleaner 700.

The memory 770 may include at least one type of storage medium among a flash memory type, a hard disk type, a solid state disk type, an Silicon Disk Drive type (SDD) type, a multimedia card micro type, a card type memory (e.g., SD or XD memory), random access memory (RAM), static random access memory (SRAM), read-only memory (ROM), electrically erasable programmable read-only memory (EEPROM) programmable read-only memory (PROM), magnetic memory, magnetic disk, and optical disk.

The processor 780 may typically control the overall operation of the air cleaner 700. The processor 780 may provide or process appropriate information or functionality to the user by processing signals, data, information, or the like that are input or output through the components discussed above.

The processor 780 may also control at least one of the fan motor 750 and the air flow control device 755 based on the purification information of the air cleaner 700. Here, the purification information may include at least one of an operation mode, an air volume, and a wind direction.

The blowing device 740 may include a suction port and a discharge port.

The air flow control device 755 may change the flow direction of the air discharged from the discharge port of the blowing device.

The fan motor 750 is installed inside the blowing device 740 and may blow air by rotating a blowing fan (not shown) provided inside the blowing device 740. Accordingly, the fan motor 750 may generate air flow.

That is, when the fan motor 750 is driven, the blowing fan rotates. As the blowing fan rotates, air is sucked through the suction port, and air may be discharged through the discharge port.

Further, a purifying unit 745 is installed inside the blowing device 740, and the purifying unit may purify air as the air is sucked through the suction port and the air is discharged through the discharge port.

The processor 780 may control the operation of at least one of the fan motor 750 and the air flow control device 755 based on the operation mode of the purification information. As the operation of at least one of the fan motor 750 and the air flow control device 755 is controlled, the operation mode of the air cleaner may be adjusted.

The processor 780 may also control the operation of at least one of the fan motor 750 and the air flow control device 780 based on the air flow rate among the purification information. As the operation of at least one of the fan motor 750 and the air flow control device 780 is controlled, the air flow rate of the air cleaner 780 may be adjusted.

The processor 780 may control the operation of the air flow control device 780 based on the air flow direction among the purification information. As the operation of the air flow control device 780 is controlled, the air flow direction of the air cleaner 780 may be adjusted.

The power supply unit 790 receives external power and internal power under the control of the processor 780 and supplies power to the components included in the air cleaner 700.

At least some of the components may operate in cooperation with one another to implement the operation, control, or control method of the air cleaner according to various embodiments described below. Also, the operation, control, or control method of the air cleaner may be implemented on the air cleaner by executing at least one application program stored in the memory 770.

Next, a ventilation device 300 will be described. The term 'ventilation device' 300 may be used interchangeably with the term 'ventilation system' 300.

Figure 4:
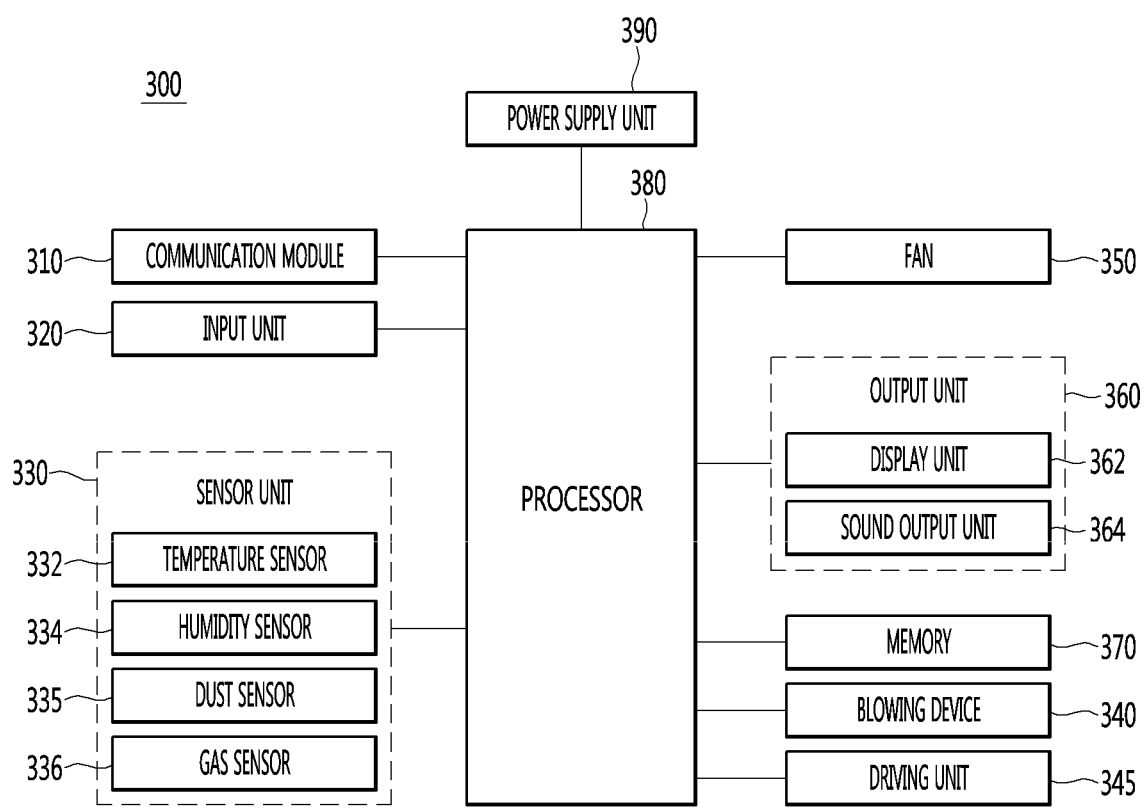
FIG. 4 is a schematic block diagram of components included in a ventilation device according to an embodiment of the present invention.

FIG. 4 is a schematic block diagram of components included in a ventilation device according to an embodiment of the present invention.

Referring to FIG. 4, the ventilation device 300 may include a communication unit 310, an input unit 320, a sensor unit 330, a blowing device 340, a driving unit 345, a fan 350, an output unit 360, a memory 370, a processor 380, and a power supply 390. The components shown in FIG. 4 are not essential for implementing the ventilation device and therefore, the ventilation device described herein may have more or less components than those listed above.

More specifically, the communication unit 310 of the above-mentioned components may include one or more modules for enabling wired communication or wireless communication between the ventilation device 300 and an external device (e.g., a mobile terminal such as a moving agent, a smartphone, or a tablet PC, or a fixed terminal such as a desktop computer) or between the ventilation device 300 and an external server.

The communication unit 310 may also include one or more modules that connect the ventilation device 300 to one or more networks.

When the communication unit 310 supports wireless communication, the communication unit 310 may include at least one of a wireless Internet module and a short-range communication module.

The wireless Internet module 113 refers to a module for wireless Internet access and may be provided inside or outside the ventilation device 300.

The wireless Internet module is configured to transmit and receive wireless signals in a communication network according to wireless Internet technologies. The wireless Internet technologies may include, for example, WLAN (Wireless LAN), Wi-Fi (Wireless-Fidelity), Wi-Fi (Wireless Fidelity) Direct, and DLNA (Digital Living Network Alliance).

The short-range communication module is for short-range communication and may support short-range communication by using at least one of technologies such as Bluetooth™, Infrared Data Association (IrDA), ZigBee, and NFC (Near Field Communication. The short-range communication module may support wireless communication between the ventilation device 300 and the external device through wireless area networks. The wireless area networks may be wireless personal area networks.

The input unit 320 may include a touch key, a mechanical key, a dial key, and the like for receiving information or commands from a user. According to an embodiment, the input unit 320 may be understood as a concept including an interface unit that receives information or commands from a separate remote control device.

Specifically, the input unit 320 is for receiving information from the user, and the processor 380 may control operation of the ventilation device 300 so as to correspond to input information when the information is inputted through the input unit 320.

The input unit 320 may include a mechanical input unit (or a mechanical key such as a button located on the front, rear or side of the ventilation device 300, a dome switch, a jog wheel, a jog switch, or the like) and touch input means.

As an example, the touch input means may include a virtual key, a soft key, or a visual key displayed on the touch screen through software processing, or a touch key disposed in the other portion than the touch screen. Meanwhile, the virtual key or visual key may be displayed on the touch screen while having various forms, and may be made of, for example, a graphic, text, icon, video, or a combination thereof.

The sensor unit 330 may include one or more sensors for sensing at least one of surrounding environment information of the ventilation device 300 and user information.

For example, the sensor unit 330 may include a temperature sensor 332 for sensing a temperature of a space in which the ventilation device 300 is installed, and a humidity sensor 334 for sensing a humidity of the space.

The sensor unit 330 may include a dust sensor 335 for sensing the amount of dust in the air and a gas sensor 336 for sensing the amount of gas in the air.

The output unit 360 is for generating an output related to sight, hearing, or the like, and may include at least one of a display unit 362, and a sound output unit 364 (for example, a speaker)

The display unit 362 may implement a touch screen in such a manner that the display unit 151 forms a layer structure with or is integrally formed with a touch sensor. Such a touch screen may function as a user input unit 320 that provides an input interface between the ventilation device 300 and the user and may provide an output interface between the ventilation device 300 and the user.

The display unit 362 may display various types of information related to the operation of the ventilation device 300. For example, the display unit 362 may display information such as an air volume or an air flow direction of the ventilation device 300, a current room temperature, a humidity, or an air quality, and information on an operation mode such as a power saving mode, a general mode, or a sleep mode.

The sound output unit 364 may output a signal in the form of speech to notify the occurrence of an event of the ventilation device 300. Examples of events occurring in the ventilation device 300 may include an alarm, power on/off, error occurrence, operation mode change, and the like.

The memory 370 may store data that supports various functions of the ventilation device 300. The memory 370 may store various data and instructions for the operation of the ventilation device 300.

The memory 370 may include at least one type of storage medium among a flash memory type, a hard disk type, a solid state disk type, an Silicon Disk Drive type (SDD) type, a multimedia card micro type, a card type memory (e.g., SD or XD memory), random access memory (RAM), static random access memory (SRAM), read-only memory (ROM), electrically erasable programmable read-only memory (EEPROM) programmable read-only memory (PROM), magnetic memory, magnetic disk, and optical disk.

The processor 380 may typically control the overall operation of the ventilation device 300. The processor 380 may provide or process appropriate information or functionality to the user by processing signals, data, information, or the like that are input or output through the components discussed above.

The blowing device 340 may include a suction port and a discharge port.

The blowing device 340 may include an opening/closing door. Here, the opening/closing door may include a window or a door.

The fan 350 may include at least one of an air supply fan and an air discharge fan.

The fan 350 may be rotated by a motor to blow air.

Specifically, the fan 350 may be rotated by a motor to introduce outside air into the room. In this case, outside air may be sucked into the room through the suction port.

In addition, the fan 350 may be rotated by the motor to allow the indoor air to be discharged to the outside. In this case, indoor air may be discharged to the outside through the discharge port.

On the other hand, the driving unit 340 may open or close the opening/closing door. In detail, the driving unit 340 includes means (e.g., a motor) for opening or closing the opening/closing door, and may open or close the opening/closing door under the control of the processor 380.

When the ventilation system operates, the processor 380 may allow the driving unit 340 to open the opening/closing door. On the other hand, when the ventilation system stops operating, the processor 380 may allow the driving unit 340 to close the opening/closing door.

The processor 380 may control the overall operation of the ventilation device.

The power supply unit 390 receives power from external power and internal power under the control of the processor 380 to supply power to components included in the ventilation device 300.

At least some of the components may operate in cooperation with one another to implement the operation, control, or control method of the ventilation device according to various embodiments described below. Also, the operation, control, or control method of the ventilation device may be implemented on the ventilation device by executing at least one application program stored in the memory 770.

Meanwhile, the artificial intelligence device 100 may communicate with the air cleaning system 700 and the ventilation system 300.

Meanwhile, in the foregoing description, the air cleaning system 700 and the ventilation system 300 have been described separately, but the present invention is not limited thereto. An air management system incorporating the air cleaning system 700 and the ventilation system 300 may be provided. In this case, the air management system may operate in an air cleaning mode, a ventilation mode, and an air cleaning and ventilation mode. In addition, the artificial intelligence device 100 may communicate with the air management system and adjust an operation mode of the air management system.

Meanwhile, the artificial intelligence device 100, the air cleaning system 700, and the ventilation system 300 are described as being separate devices or systems, but are not limited thereto.

For example, the artificial intelligence device 100 may be a system integrated with the air cleaning system 700, the ventilation system 300, or the air management system.

FIG. 5 is a diagram for explaining a method of operating an artificial intelligence device according to an embodiment of the present invention.

According to an embodiment of the present invention, a method of operating an artificial intelligence device may include obtaining an external environmental factor and an internal environmental factor collected by a sensor (S510), predicting a subsequent internal environmental factor using the internal environmental factor (S530), and allowing a ventilation system and an air purifying system to operate in connection with the predicted internal environmental factor (S550).

The prediction of the subsequent internal environmental factor may be performed by an environmental factor prediction model. Therefore, the environmental factor prediction model will be first described.

Figure 7:
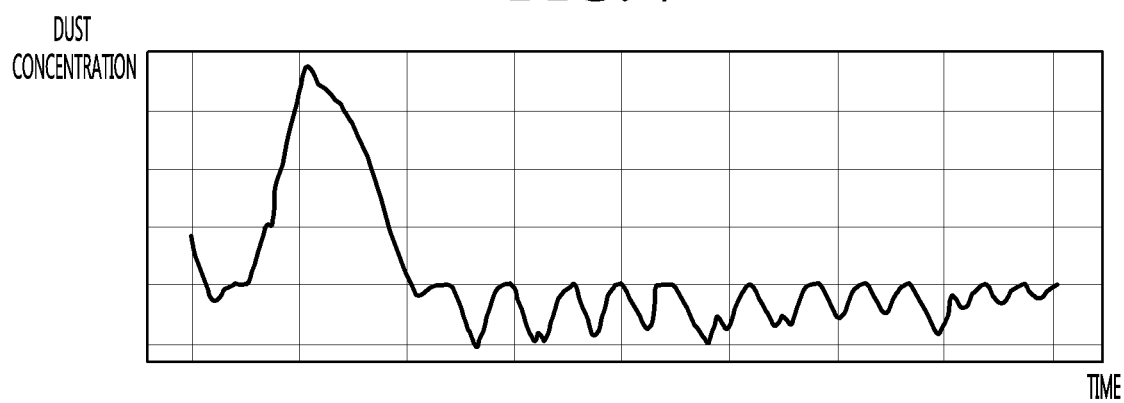

FIGS. 6 and 7 are diagrams for describing a method of generating an environmental factor prediction model according to an embodiment of the present invention.

Herein the environmental factor may include at least one of a dust concentration, a gas concentration and a temperature.

The dust concentration may include at least one of a suspended dust concentration (50 μm or less), a fine dust concentration (PM10), and an ultra-fine dust concentration (PM2.5).

In addition, the gas concentration may include at least one of a carbon dioxide concentration and a volatile organic compound concentration.

The environmental factor prediction model may be a model for identifying a change pattern of a time-varying environmental factor and predicting a subsequent environmental factor using the change pattern of the environmental factor.

For example, in an office, a carbon dioxide concentration may increase dramatically when employees enter the office in a short period to go to work. Conversely, when employees leave the office for a short period of time to get off work, the carbon dioxide concentration may drop dramatically In another example, an indoor (internal) fine dust concentrations may remain similar when the employees who works in the office don't open windows with cold in the winter. However, when the employees who works in the office open the window in the spring, the indoor (internal) fine dust concentration may vary.

In another example, at home, when a window is opened at 10 o'clock every morning, the indoor (internal) fine dust concentration may vary. When a house is cleaned every Sunday from 2 pm to 4 pm, an indoor (internal) fine dust concentration may increase.

In addition, when all family members gather at home around 7 pm at home, the indoor carbon dioxide concentrations may increase from 7 pm.

Therefore, as illustrated in FIGS. 6 and 7, the environmental factor prediction model may be an artificial neural network trained (model parameters are set (updated)) using indoor environmental factor that vary over time as training data. Accordingly, when input data is received, the environmental factor prediction model may output an output value.

That is, when an environmental factor is received at the present time point or from a predetermined time point to the present time point, the environmental factor prediction model may predict a subsequent environmental factor.

Meanwhile, the environmental factor may be time-series data, and may be a time-varying data.

Therefore, a neural network constituting the environmental factor prediction model may be a recurrent neural network (RNN) which learns data that varies over time, such as time-series data. In this case, long-short term memory (LSTM) may be used.

In addition, the recurrent neural network (RNN) is trained using data over a certain period of time, so that internal model parameters may be set (updated). Accordingly, when new input data is received, the environmental factor prediction model may output an output value. That is, when an environmental factor is received at the present time point or from a predetermined time point to the present time point, the environmental factor prediction model may predict a subsequent environmental factor.

Meanwhile, the learning device 200 of the artificial neural network may train a recurrent neural network (RNN) using data over a predetermined period of time in an environment in which a ventilation system and an air cleaning system are installed.

For example, when the ventilation system and the air cleaning system are to be installed in a building A, the learning device 200 of the artificial neural network may train the recurrent neural network by using log data for one year, which records the environmental factors of the building A.

On the other hand, the learning device 200 of the artificial neural network may train a recurrent neural network (RNN) using data for a predetermined period of time or more, which is obtained without a process of allowing, by the artificial intelligence device, a ventilation system and an air cleaning system to operate cooperatively with each other, in an environment in which a ventilation system and an air cleaning system are installed.

Meanwhile, the environmental factor prediction model may be updated.

For example, the artificial neural network constituting the environmental factor prediction model may be retrained using the latest year's environmental factors in the environment in which the ventilation system and the air cleaning system are installed, so that the model parameters may be updated.

Figure 8:
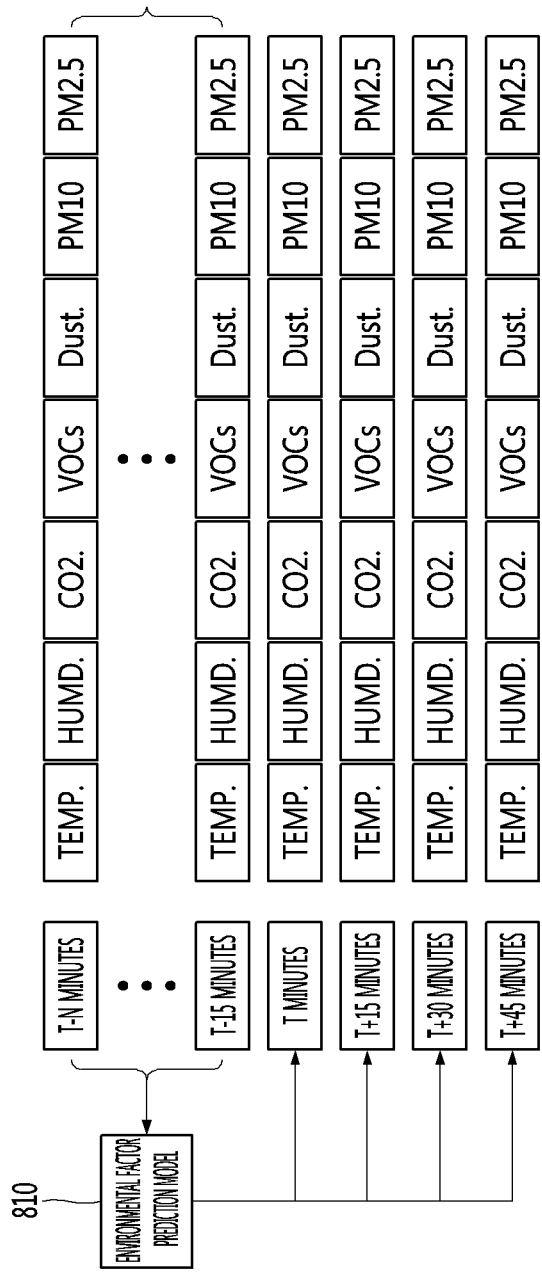
FIG. 8 is a diagram for describing various environmental factor prediction models according to an embodiment of the present invention.

FIG. 8 is a diagram for describing various environmental factor prediction models according to an embodiment of the present invention.

The environmental factor prediction model 810 may include a plurality of environmental factor prediction models classified according to training data and environmental factors to be predicted.

For example, as illustrated in FIGS. 6 and 7, the artificial neural network may be trained using the indoor dust concentration for a predetermined time unit as training data. As described above, a neural network trained to predict a future dust concentrations using a time-varying dust concentration as training data may be referred to as a dust concentration prediction model.

In addition, among the dust concentration prediction models, a neural network trained to predict a future ultra-fine dust concentration using the ultra-fine dust concentration that varies over time as training data may be referred to as an ultra-fine dust concentration prediction model.

In the same principle, the dust concentration prediction model may include a suspended dust prediction model or a fine dust prediction model.

In addition, in the same principle, the environmental factor prediction model may include a gas concentration prediction model, and the gas concentration prediction model may include at least one of a carbon dioxide concentration prediction model and a volatile organic compound concentration prediction model.

Here, the carbon dioxide concentration prediction model may be a neural network that is trained to predict a future carbon dioxide concentration by using a time-varying carbon dioxide concentration as training data.

In the same principle, the environmental factor prediction model may include a temperature prediction model. Here, the temperature prediction model may be a neural network that is trained to predict a future temperature by using a time-varying temperature as training data.

In addition, the environmental factor prediction model may include an indoor environmental factor prediction model that is a neural network trained to predict a future indoor environmental factor using indoor environmental factors (indoor dust, suspended dust, fine dust, ultra-fine dust, gas, carbon dioxide, volatile organic compound, temperature, or the like) as training data.

In addition, the environmental factor prediction model may include an outdoor environmental factor prediction model that is a neural network trained to predict a future outdoor environmental factor using outdoor environmental factors (outdoor dust, suspended dust, fine dust, ultra-fine dust, gas, carbon dioxide, volatile organic compound, temperature, or the like) as training data.

Meanwhile, the environmental factor prediction model may be mounted on the artificial intelligence device 100.

On the other hand, the environmental factor prediction model may be implemented in hardware, software, or a combination of hardware and software, and, when a part or whole of the environmental factor prediction model is implemented in software, one or more instructions constituting the environmental factor prediction model may be stored in memory 170.

Next, with reference to FIGS. 9 to 12, operation of the artificial intelligence device 100 equipped with the environmental factor prediction model will be described.

The processor 180 of the artificial intelligence device 100 may acquire an external environmental factor through the communication unit.

Herein, external environmental factors may include at least one of an external (outdoor) dust concentration, a gas concentration, and a temperature.

Herein, the outdoor dust concentration may include at least one of an external suspended dust concentration (50 μm or less), an external fine dust concentration (PM10), and an external ultra-fine dust concentration (PM2.5).

In addition, the external gas concentration may include at least one of an external carbon dioxide concentration and an external volatile organic compound concentration.

Meanwhile, the processor 180 may receive external environmental factors from an externally-mounted sensor (dust sensor, gas sensor, temperature sensor, or the like) or may be received from a server connected through a network.

Meanwhile, the processor 180 of the artificial intelligence device 100 may obtain an internal environmental factor through the communication unit.

Herein, the internal environmental factor may include at least one of an internal (indoor) dust concentration, an indoor gas concentration, and an indoor temperature.

The internal dust concentration may include at least one of an internal suspended dust concentration (50 μm or less), an internal fine dust concentration (PM10), and an internal ultra-fine dust concentration (PM2.5).

Also, the internal gas concentration may include at least one of the internal carbon dioxide concentration and the internal volatile organic compound concentration.

Meanwhile, the processor 180 may receive the internal environmental factors from a sensor (a dust sensor, a gas sensor, a temperature sensor, or the like) mounted inside, or may receive the same from a ventilation system or an air cleaning system. In this case, the ventilation system or the air cleaning system may collect the internal environmental factors by itself.

Meanwhile, the processor 180 may provide the internal environmental factors to an environmental factor prediction model. The environmental factor prediction model may output output data based on input data.

That is, the environmental factor prediction model may output a subsequent internal environmental factor based on an internal environmental factor that is inputted. Accordingly, the processor 180 may predict the subsequent internal environmental factor.

Meanwhile, the processor 180 may provide the internal environmental factor to the environmental factor prediction model at certain time intervals. In this case, the environmental factor prediction model may output a subsequent internal environmental factor at a predetermined time unit.

Meanwhile, the processor 180 may allow the ventilation system and the air cleaning system to operate cooperatively with each other based on the predicted internal environmental factors.

In this context, allowing the ventilation system and the air cleaning system to operate cooperatively with each other may mean that the processor is configured to allow only the ventilation system to operate, allow only the air cleaning system to operate, allow both the ventilation system and the air cleaning system to operate, or allow both the ventilation system and the air cleaning system to stop operating, using a least one of a real-time internal dust concentration, a predicted internal dust concentration, a real-time external dust concentration, a predicted external dust concentration, and other environmental information, Meanwhile, terms are defined.

The predicted internal dust concentration may refer to a future internal dust concentration output by the internal dust concentration prediction model based on input data (internal dust concentration).

In addition, the predicted external dust concentration may be a future dust concentration output by the external dust concentration prediction model based on the input data (external dust concentration), or a predicted future dust concentration predicted by another system such as an analysis of a national weather service.

In addition, the real-time internal dust concentration may mean a current internal dust concentration detected by the sensor.

In addition, the real-time external dust concentration may refer to a current internal dust concentration sensed by a sensor or detected by another system such as an analysis of the national weather service.

The cooperative operation of the ventilation system and the air cleaning system according to the prediction of the internal dust concentration will be described below.

Figure 9:
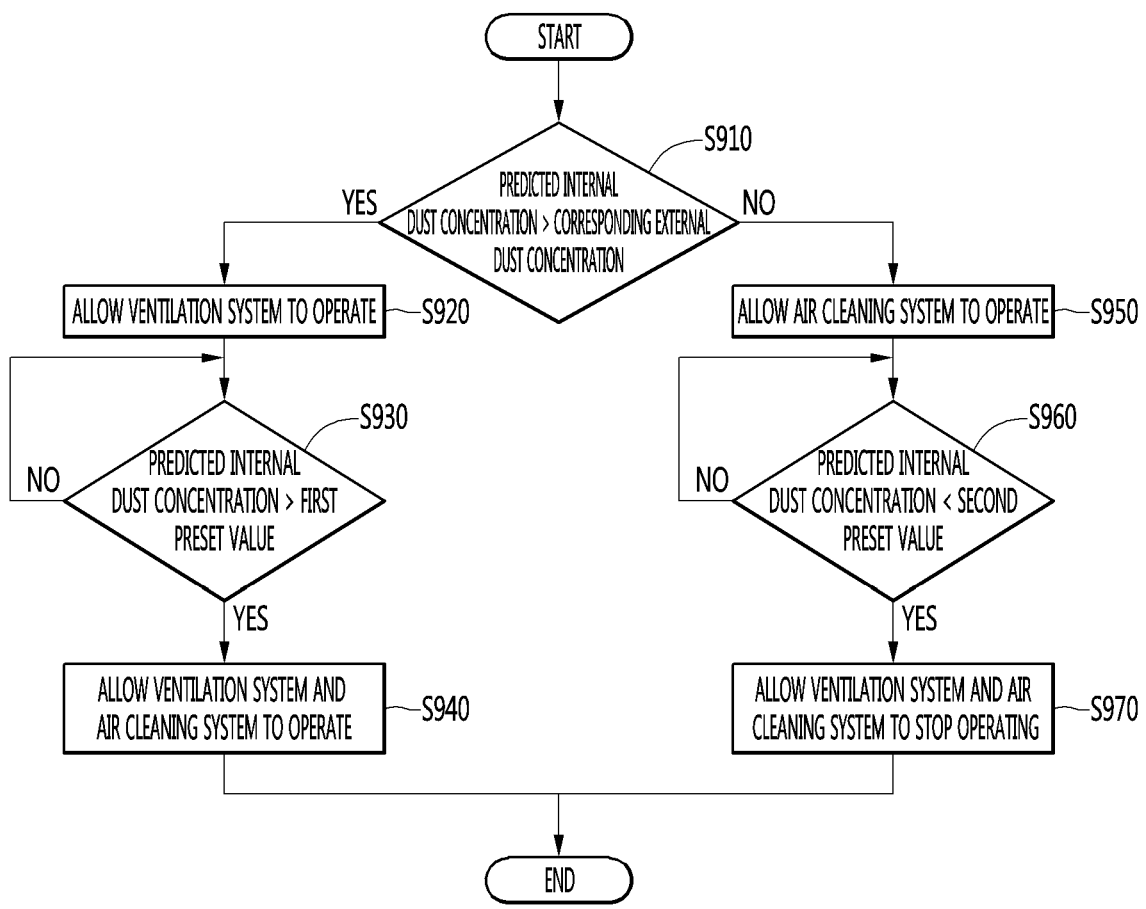
FIG. 9 is a diagram for describing cooperative operation based on a predicted internal dust concentration and a corresponding external dust concentration according to an embodiment of the present invention.

FIG. 9 is a diagram for describing operative operation based on a predicted internal dust concentration and a corresponding external dust concentration according to an embodiment of the present invention.

The processor 180 may predict a subsequent internal dust concentration by inputting the internal dust concentration into an internal dust concentration prediction model. In addition, the processor 180 may allow the ventilation system and the air cleaning system to operate cooperatively with each other the predicted internal dust concentration.

Specifically, the processor 180 may compare the predicted internal dust concentration with a corresponding external dust concentration (S910).

Herein, the corresponding external dust concentration may be a real-time external dust concentration.

However, the present invention is not limited thereto, and the corresponding external dust concentration may be a predicted external dust concentration closest in time to the predicted internal dust concentration. For example, when the internal dust concentration after 15 minutes was predicted and the external dust concentration after 10 minutes and the external dust concentration after 30 minutes were predicted, the external dust concentration corresponding to the internal dust concentration after 15 minutes may be the external dust concentration after 10 minutes.

On the other hand, when the predicted internal dust concentration is higher than the corresponding external dust concentration, the processor 180 may allow the ventilation system to operate (S920).

Specifically, when the predicted internal dust concentration is higher than the corresponding external dust concentration, the processor 180 may transmit an operation command to the ventilation system that is not currently operating or may not transmit an operation stop command to the ventilation system that is currently operating. Also, the processor 180 may not transmit an operation command to the air cleaning system that is not currently operating or transmit an operation stop command to the air cleaning system that is currently operating.

In this case, the processor 380 of the ventilation system 300 may perform control to perform ventilation. In detail, the processor 380 of the ventilation system may allow a motor to drive at least one of the air supply fan and the air discharge fan, or allow the driving unit 345 to open an opening/closing door.

On the other hand, when the predicted internal dust concentration is lower than a corresponding external dust concentration, the processor 180 may allow the air cleaning system to operate (S950).

Specifically, when the predicted internal dust concentration is lower than the corresponding external dust concentration, the processor 180 may transmit an operation command to the air cleaning system that is not currently operating or may not transmit an operation stop command to the air cleaning system that is currently operating. Also, the processor 180 may not transmit an operation command to the ventilation system that is not currently operating or transmit an operation stop command to the ventilation system that is currently operating.

In this case, the processor 780 of the air cleaning system may perform control to perform air cleaning. Specifically, the processor 780 of the air cleaning system may control the fan motor so as to generate an air flow by rotating a fan.

When the ventilation system is allowed to operate in a case in which the outdoor (external) dust concentration is higher than the indoor (internal) dust concentration, it may be disadvantageous for the purification of indoor air.

In addition, when the indoor dust concentration is higher than the outdoor dust concentration, operating the ventilation system rather than operating the air cleaning system may cause a rapid purification of indoor air, and power consumption may be reduced by opening the opening/closing door such as a window, instead of operating an air cleaner.

According to the present invention, by comparing the indoor dust concentration with the outdoor dust concentration and selectively operating the ventilation system and the air cleaner according to a comparison result, it is possible to perform optimal air conditioning and reduce the power consumption.

In addition, when the ventilation system and the air purifier are selectively operated by comparing the real-time indoor dust concentration with the outdoor dust concentration, there may occur a problem that the system is repeatedly turned on and off according to frequent changes of the real-time indoor dust concentration.

However, since the present invention allow the ventilation system and the air cleaning system to operate cooperatively with each other based on the prediction of the dust concentration by the environmental factor prediction model, it is possible to solve the problem that the system is repetitively turned on/off and grasp and cope with the change of the indoor dust concentration in advance.

In addition, there are many cases in which users always turn on the ventilation system and the air cleaning system, or turn on the ventilation system and the air cleaning system together when the indoor dust concentration increases. However, the present invention has an advantage of reducing the energy consumption by alternately operating the ventilation system and the air cleaning system.

Meanwhile, when the predicted internal dust concentration is higher than a corresponding external dust concentration and larger than a first preset value, the processor 180 may allow the ventilation system and the air cleaning system to operate (S930 and S940).

Specifically, in a state in which the ventilation system is operating because a predicted internal dust concentration is higher than a corresponding external dust concentration (S920), when the predicted internal dust concentration is greater than the first preset value, the processor may allow the ventilation system and the air cleaning system to operate.

In this case, the processor 180 may transmit an operation command to the air cleaning system that is not currently operating, and may not transmit an operation stop command to the ventilation system that is currently operating.

Meanwhile, when the predicted internal dust concentration is higher than the corresponding external dust concentration but lower than the first preset value, the processor 180 may allow only the ventilation system to operate continuously.

When the external dust concentration is higher than the internal dust concentration, it is energy efficient to operate only the ventilation system. It is noted that, when the internal dust concentration is very high, faster air purification may be required rather than the energy efficiency. Therefore, the present invention may allow the ventilation system and the air cleaning system to operate together when the predicted internal dust concentration is higher than the corresponding external dust concentration and higher than the first preset value.

Meanwhile, when the predicted internal dust concentration is smaller than the corresponding external dust concentration and smaller than a second preset value, the processor 180 may allow the ventilation system and the air cleaning system to stop operating (S960 and S970).

Specifically, in a state where the air cleaning system is operating when the predicted internal dust concentration is lower than the corresponding external dust concentration (S950), when the predicted internal dust concentration is smaller than the second preset value, the processor may allow the ventilation system and the air cleaning system to stop operating.

In this case, the processor 180 may transmit an operation stop command to the air cleaning system that is currently operating.

Meanwhile, when the predicted internal dust concentration is lower than the corresponding external dust concentration but higher than the second preset value, the processor 180 may allow only the air cleaning system to operate continuously.

When the external dust concentration is higher than the internal dust concentration, it is advantageous for the air cleaning to operate only the air cleaning system. It is noted that when the internal dust concentration is very low, it is advantageous in terms of energy saving to turn off the air cleaning system as well. Thus, the present invention may turn off both the ventilation system and the air cleaning system when the predicted internal dust concentration is lower than the corresponding external dust concentration and less than the first preset value.

Figure 10:
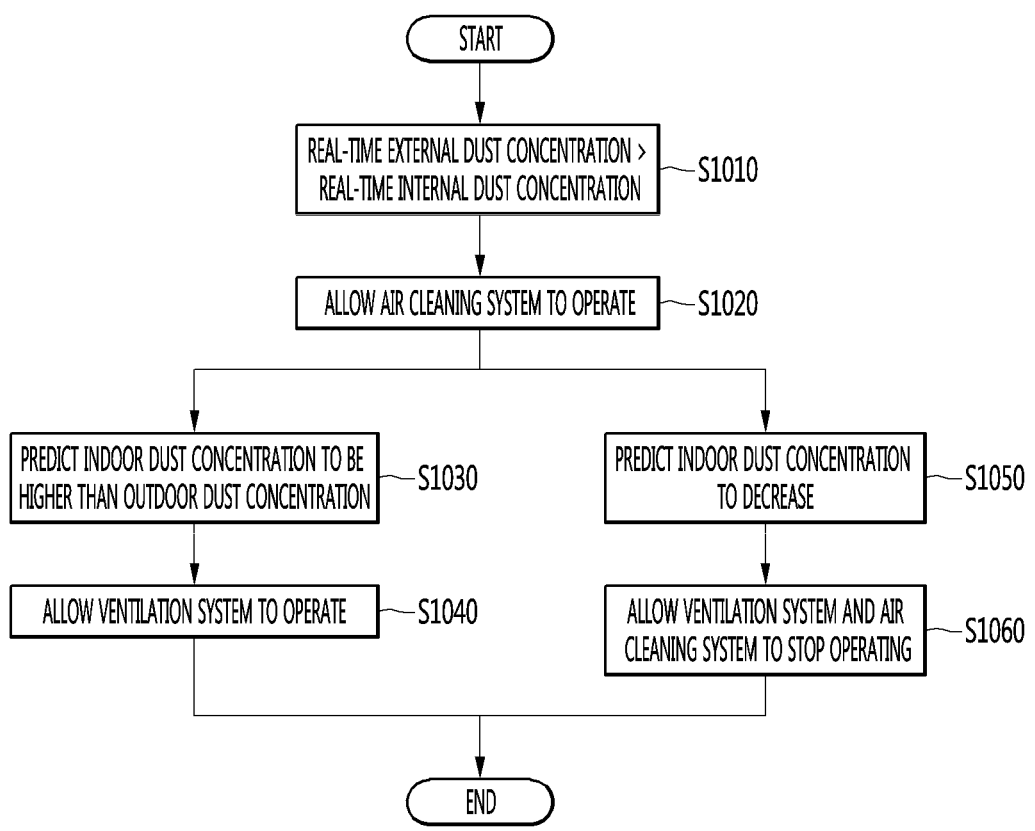
FIG. 10 is a diagram for describing a method of operating an artificial intelligence device while an air cleaning system is operating in a state in which a real-time external dust concentration is higher than a real-time internal dust concentration according to an embodiment of the present invention.

FIG. 10 is a diagram for describing a method of operating an artificial intelligence device while an air cleaning system is operating in a state in which a real-time external dust concentration is higher than a real-time internal dust concentration according to an embodiment of the present invention.

The air cleaning system is operating in a state where the real-time external dust concentration is higher than the real-time internal dust concentration (S1010 and S1020).

The processor 180 may compare a predicted internal dust concentration with a corresponding external dust concentration.

When the predicted internal dust concentration is higher than the corresponding external dust concentration while the air cleaning system is operating in a state where the real-time external dust concentration is higher than the real-time internal dust concentration, the processor 180 may allow the air cleaning system to stop operating and the ventilation system to operate (S1030 and S1040).

In other words, it is currently advantageous to allow the air cleaning system to operate because the real-time external dust concentration is higher than the real-time internal dust concentration, but it is more advantageous to allow the ventilation system to operate because it is predicted that the internal dust concentration becomes high soon.

In addition, according to the present invention, it is possible to quickly detect and cope with a change in the indoor dust concentration in advance. Even when a frequent change in the real-time indoor dust concentration occurs, it is possible to operate the system stably without repeatedly turning on/off the system.

On the other hand, when the indoor dust concentration is predicted to decrease while the air cleaning system is operating in a state in which the real-time external dust concentration is higher than the real-time internal dust concentration, the processor may stop the air cleaning system and the ventilation system to stop operating (S1050 and S1060).

Specifically, when the predicted internal dust concentration is lower than the real-time internal dust concentration while the air cleaning system is operating in a state when the real-time external dust concentration is higher than the real-time internal dust concentration, the processor 180 may transmit an operation stop command to the air cleaning system. In addition, the processor 180 may allow the ventilation system to continuously stop operating in a state where the ventilation system is not currently operating.

In other words, the current state is a state where the air cleaning system is operating because the real-time external dust concentration is higher than the real-time internal dust concentration and the internal dust concentration is predicted to decrease even when the air cleaning system is not to operate.

Therefore, according to the present invention, the internal dust concentration is predicted to decrease without the operation of the air cleaning system, and accordingly, the operation of the air cleaning system is also stopped, thereby reducing power consumption.

Figure 11:
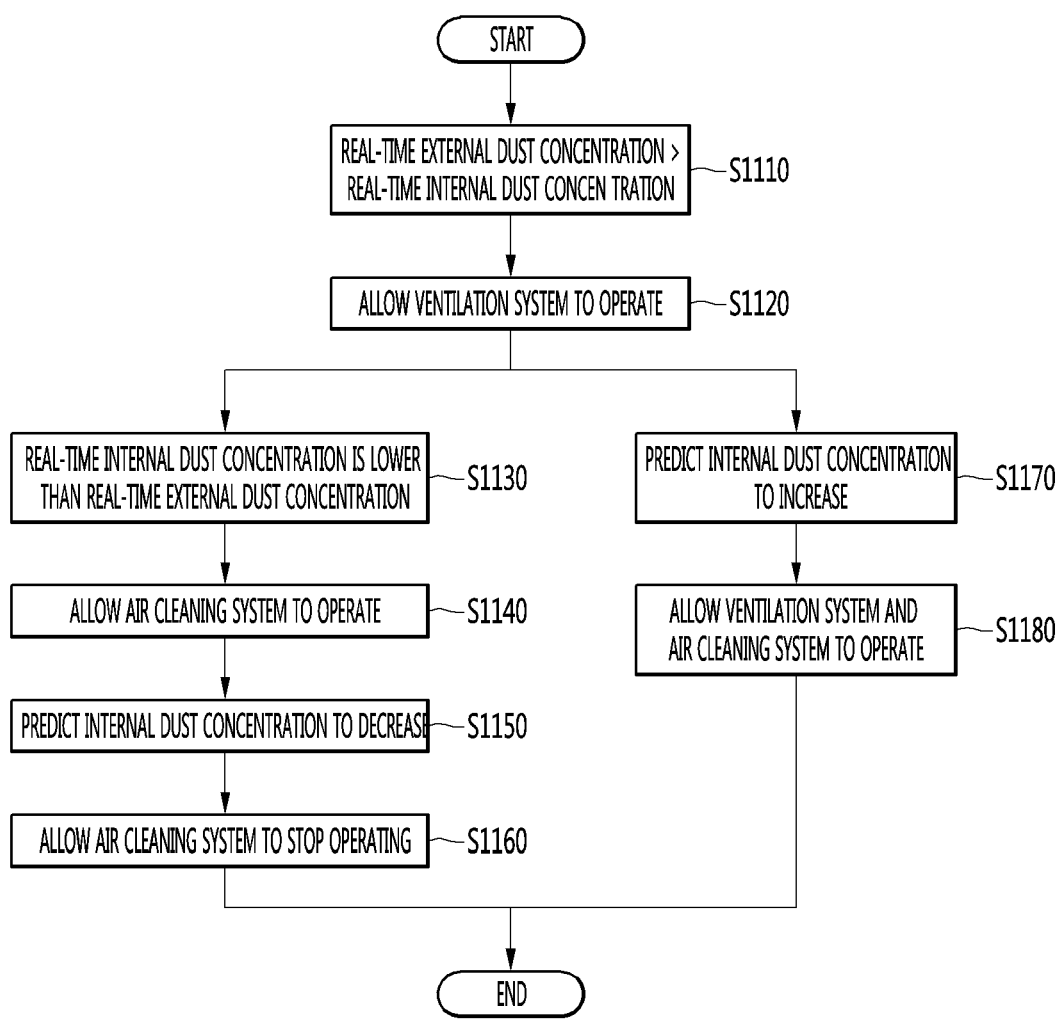
FIG. 11 is a diagram for describing a method of operating an artificial intelligence device while an air cleaning system is operating in a state in which a real-time external dust concentration is lower than a real-time internal dust concentration according to an embodiment of the present invention.

FIG. 11 is a diagram for describing a method of operating an artificial intelligence device while an air cleaning system is operating in a state in which a real-time external dust concentration is lower than a real-time internal dust concentration according to an embodiment of the present invention.

When the real-time internal dust concentration is higher than the real-time external dust concentration, the processor 180 may allow the ventilation system to operate (S1110 and S1120).

In other words, when the real-time internal dust concentration is higher than the real-time external dust concentration, ventilation may be helpful for purification. In this case, by operating the ventilation system such as opening a window instead of purification using an air cleaner, there is an advantage that purification of air is achieved while saving energy.

On the other hand, when the real-time internal dust concentration is lower than the real-time external dust concentration while the ventilation system is operating in a state where the real-time internal dust concentration is higher than the real-time external dust concentration, the processor may allow the ventilation system to stop operating and allow the air cleaning system to operate (S1130 and S1140).

Specifically, even when the real-time internal dust concentration is predicted to be lower than the real-time external dust concentration (that is, even when the predicted internal dust concentration is lower than a current real-time external dust concentration), the processor will allow the ventilation system to stop operating and allow the air cleaning system to operate only when the real-time internal dust concentration is lower than the real-time external dust concentration.

When the internal dust concentration is predicted to decrease, energy consumption will increase when the air cleaning system is operated immediately according to a prediction result. Therefore, even though it is predicted that the internal dust concentration decreases, the opening/closing door remains open, and when the real-time internal dust concentration is lower than the real-time external dust concentration, the opening/closing door is closed and the air cleaning system then operates, thus reducing the energy consumption.

On the other hand, when the internal dust concentration is predicted to decrease, the processor may allow the air cleaning system to stop operating (S1150 and S1160).

Specifically, when the predicted internal dust concentration is lower than the real-time internal dust concentration after the air cleaning system operates (S1040), the processor 180 may allow the air cleaning system to stop operating. In this case, the operation of both the ventilation system and the air cleaning system may be stopped.

That is, according to the present invention, the internal dust concentration is predicted to decrease without the operation of the air cleaning system, and accordingly, the operation of the air cleaning system is also stopped, thus reducing power consumption.

On the other hand, when the internal dust concentration is predicted to increase while the ventilation system is operating in a state where the real-time internal dust concentration is higher than the real-time external dust concentration (S1110 and S1120), the processor may allow the air cleaning system and the ventilation system to operate together (S1170 and S1180).

Specifically, when the predicted internal dust concentration is higher than the real-time internal dust concentration while the ventilation system is operating in a state where the real-time internal dust concentration is higher than the real-time external dust concentration (S1110 and S1120), the processor may allow the air cleaning system and the ventilation system to operate together.

When the external dust concentration is higher than the internal dust concentration, it is energy efficient to operate only the ventilation system. It is noted that, when the internal dust concentration is very high, faster air purification may be required rather than the energy efficiency. Therefore, the present invention may allow the ventilation system and the air cleaning system to operate together when it is predicted that the internal dust concentration is predicted to increase in the state where the ventilation system is operating.

The operation of the ventilation system according to prediction of an internal carbon dioxide concentration will be described below.

Figure 12:
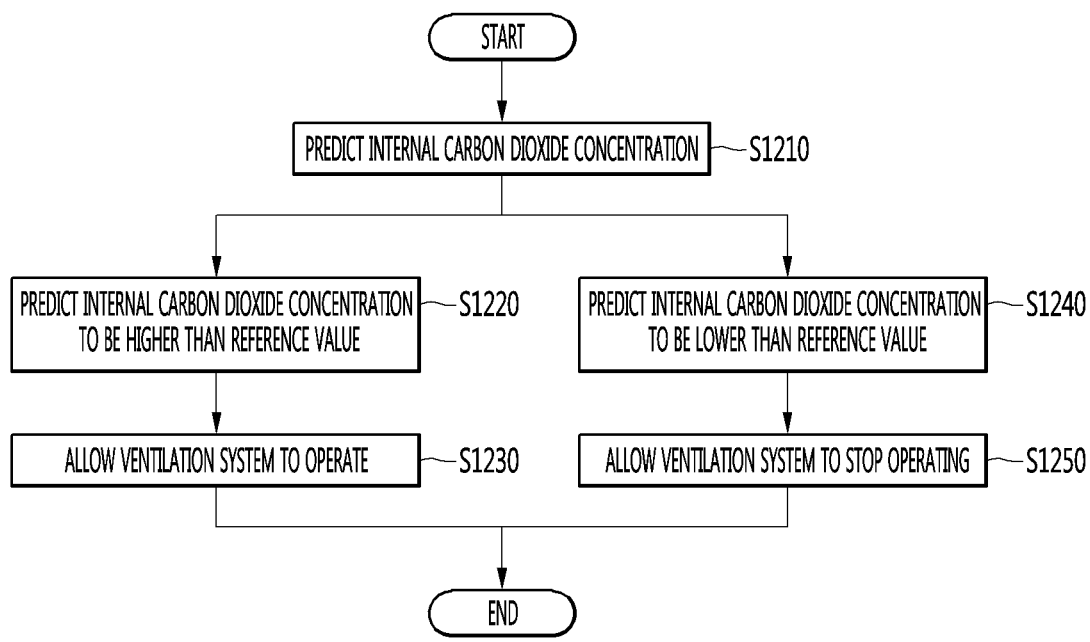
FIG. 12 is a diagram for describing operation of a ventilation system based on prediction of an internal carbon dioxide concentration according to an embodiment of the present invention.

FIG. 12 is a diagram for describing operation of a ventilation system based on prediction of an internal carbon dioxide concentration according to an embodiment of the present invention.

The processor 180 may predict a subsequent internal carbon dioxide concentration by inputting an internal carbon dioxide concentration into an internal carbon dioxide concentration prediction model (S1210).

In addition, the processor 180 may allow the ventilation system to operate or stop operating using the predicted internal carbon dioxide concentration.

Specifically, a reference value may be set. Here, the reference value may refer to a concentration at which it is necessary to be ventilated due to a high internal carbon dioxide concentration.

When the predicted internal carbon dioxide concentration is greater than the reference value, the processor 180 may allow the ventilation system to operate (S1220 and S1230).

In this case, even though a real-time internal carbon dioxide concentration is smaller than the reference value, when the predicted internal carbon dioxide concentration is larger than the reference value, the processor 180 may allow the ventilation system to operate.

It is assumed that the reference value is 50, the real-time internal carbon dioxide concentration is 40, and the carbon dioxide concentration is predicted to increase to 70. In this case, when the carbon dioxide concentration is 40 rather than when the carbon dioxide concentration is 50, the window or drawing in the outside air and lowering the carbon dioxide concentration to 20 will keep the room more comfortable.

On the other hand, when the predicted internal carbon dioxide concentration is less than the reference value, the processor 180 may allow the ventilation system to continuously stop operating (S1240 and S1250).

Specifically, when the real-time internal carbon dioxide concentration is greater than the reference value, but the predicted internal carbon dioxide concentration is smaller than the reference value, the processor may allow the ventilation system not to operate and to continuously stop operating.

When the internal carbon dioxide concentration is predicted to decrease anyway, not operating the ventilation system may be advantageous for energy saving. Therefore, when the internal carbon dioxide concentration is predicted to decrease even though the internal carbon dioxide concentration is currently high, it is possible to save energy by not operating the ventilation system according to the present invention.

On the other hand, the processor may allow the ventilation system and the air cleaning system cooperatively with each other in consideration of both the dust concentration and the carbon dioxide concentration.

Specifically, according to the above embodiments, the processor may allow the ventilation system to operate in consideration of the carbon dioxide concentration, despite a situation in which the ventilation system should not operate.

More specifically, it is assumed that the ventilation system does not operate (that is, windows are closed or no air is blown) and the air cleaning system operates because the real-time external dust concentration is higher than the real-time internal dust concentration.

In this case, when the predicted internal carbon dioxide concentration is greater than the reference value, the processor may allow the ventilation system to operate to open a window or blow outside air into the inside.

In this case, the processor may stop the operation of the air cleaning system, operate only the ventilation system, and operate both the air cleaning system and the ventilation system.

When the real-time external dust concentration is higher than the real-time internal dust concentration, the indoor dust concentration may increase by ventilation. However, the present invention has an advantage of creating a pleasant environment considering dust and carbon dioxide by performing ventilation in consideration of the internal carbon dioxide concentration, even though the indoor dust concentration further increases.

The operation of other AI devices according to the prediction of an internal temperature will be described below.

The processor may input an internal temperature to a temperature prediction model to predict a subsequent internal temperature. Here, the temperature prediction model may be a recurrent neural network trained using a time-varying indoor temperature as training data.

Further, the processor may allow the ventilation system and the air cleaning system to operate cooperatively with each other using the predicted internal dust concentration and the predicted subsequent internal temperature.

Specifically, according to the above embodiments, the processor may allow the ventilation system not to operate in consideration of the predicted subsequent internal temperature, despite a situation in which the ventilation system should operate.

More specifically, it is assumed that a predicted internal dust concentration is higher a corresponding external dust concentration. In this case, it may be advantageous to allow the ventilation system to operate in terms of air purification and energy saving.

When the predicted internal dust concentration is higher than the corresponding external dust concentration and a difference between the predicted internal temperature and a corresponding external temperature is greater than or equal to a preset value, the processor may not allow the ventilation system to operate. In this case, the processor may allow only the air cleaner to operate or may not allow both the air cleaner and the ventilation system to operate.

Even when it is advantageous to allow the ventilation system to operate in consideration of the dust concentration, energy loss occurs when the difference between the internal temperature and the external temperature is large. Therefore, according to the present invention, it is possible to create a comfortable environment in consideration of not only dust but also energy loss due to temperature difference and a user's discomfort.

The present invention described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. In addition, the top cover 31 may further include a microphone 180. Accordingly, the detailed description of the above is not restrictive construed in all aspects and should be considered as illustrative. The scope of the invention should be determined by reasonable interpretation of the appended claims and all modifications within the equivalent scope of the invention are included within the scope of the invention.

What is claimed is:

1. An artificial intelligence device comprising:
a communicator configured to obtain an external environmental factor and an internal environmental factor collected by a sensor; and
a processor configured to provide the internal environmental factor to an environmental factor prediction model to predict a subsequent internal environmental factor and allow a ventilation system and an air cleaning system to operate cooperatively with each other based on the predicted internal environmental factor,
wherein the processor is configured to input an internal dust concentration to a dust concentration prediction model to predict a subsequent internal dust concentration, and allow the ventilation system and the air cleaning system to operate cooperatively with each other based on the predicted internal dust concentration,
wherein the processor is configured to allow the ventilation system to operate when a real-time internal dust concentration is higher than a real-time external dust concentration, and
wherein the processor is configured to allow the ventilation system to stop operating and allow the air cleaning system to operate when the real-time internal dust concentration is lower than the real-time external dust concentration while the ventilation system is operating in a state in which the real-time internal dust concentration is higher than the real-time external dust concentration.

2. The artificial intelligence device of claim 1, wherein the processor is configured to allow the air cleaning system to stop operating and allow the ventilation system to operate when the predicted internal dust concentration is higher than a corresponding external dust concentration while the air cleaning system is operating in a state in which the real-time external dust concentration is higher than the real-time internal dust concentration.

3. The artificial intelligence device of claim 1, wherein the processor is configured to allow the air cleaning system and the ventilation system to stop operating when the predicted internal dust concentration is lower than the real-time internal dust concentration while the air cleaning system is operating in a state in which the real-time external dust concentration is higher than the real-time internal dust concentration.

4. The artificial intelligence device of claim 1, wherein the processor is configured to allow the air cleaning system to stop operating when the predicted internal dust concentration is lower than the real-time internal dust concentration after allowing the air cleaning system to operate.

5. The artificial intelligence device of claim 1, wherein the processor is configured to allow the ventilation system and the air cleaning system to operate together when the predicted internal dust concentration is higher than the real-time internal dust concentration while the ventilation system is operating in a state in which the real-time internal dust concentration is higher than the real-time external dust concentration.

6. The artificial intelligence device of claim 1, wherein the dust concentration prediction model is a recursive neural network (CNN) trained using a time-varying indoor dust concentration as training data.

7. The artificial intelligence device of claim 1, wherein the processor is configured to:
allow the ventilation system to operate when the predicted internal dust concentration is higher than a corresponding external dust concentration, and
allow the air cleaning system to operate when the predicted internal dust concentration is lower than the corresponding external dust concentration.

8. The artificial intelligence device of claim 7, wherein the processor is configured to:
allow the ventilation system and the air cleaning system to operate when the predicted internal dust concentration is higher than the corresponding external dust concentration and is greater than a first preset value, and
allow the ventilation system and the air cleaning system to stop operating when the predicted internal dust concentration is less than a second preset value.

9. An artificial intelligence device comprising:
a communicator configured to obtain an external environmental factor and an internal environmental factor collected by a sensor; and
a processor configured to provide the internal environmental factor to an environmental factor prediction model to predict a subsequent internal environmental factor and allow a ventilation system and an air cleaning system to operate cooperatively with each other based on the predicted internal environmental factor,
wherein the processor is configured to input an internal carbon dioxide concentration to a carbon dioxide concentration prediction model to predict a subsequent internal carbon dioxide concentration, and allow the ventilation system to operate and the ventilation system to stop operating using the predicted internal carbon dioxide concentration, and
wherein the processor is configured to allow the ventilation system to continuously stop operating when a real-time internal carbon dioxide concentration is greater than a reference value and the predicted internal carbon dioxide concentration is less than the reference value.

10. The artificial intelligence device of claim 9, wherein the processor is configured to allow the ventilation system to operate when the predicted internal carbon dioxide concentration is greater than the reference value.

11. The artificial intelligence device of claim 9, wherein the processor is configured to allow the ventilation system to operate when the predicted internal carbon dioxide concentration is greater than the reference value while the air cleaning system is operating in a state in which a real-time external dust concentration is higher than a real-time internal dust concentration.

12. An artificial intelligence device comprising:
a communicator configured to obtain an external environmental factor and an internal environmental factor collected by a sensor; and
a processor configured to provide the internal environmental factor to an environmental factor prediction model to predict a subsequent internal environmental factor and allow a ventilation system and an air cleaning system to operate cooperatively with each other based on the predicted internal environmental factor,
wherein the processor is configured to input an internal dust concentration to a dust concentration prediction model to predict a subsequent internal dust concentration, and allow the ventilation system and the air cleaning system to operate cooperatively with each other based on the predicted internal dust concentration,
wherein the processor is configured to input an input temperature to a temperature prediction model to predict a subsequent internal temperature,
wherein the temperature prediction model is a recursive neural network (CNN) trained using a time-varying indoor temperature as training data, and
wherein the processor is configured to allow the ventilation system and the air cleaning system to stop operating cooperatively with each other based on the predicted internal dust concentration and the predicted subsequent internal temperature.

13. The artificial intelligence device of claim 12, wherein the processor is configured to allow the ventilation system not to operate when the predicted internal dust concentration is higher than a corresponding external dust concentration and a difference between the predicted internal temperature and the corresponding external temperature is equal to or greater than a preset value.

* * * * *